May 8, 1923.
E. A. SPERRY
1,454,085
ELECTRIC INDICATOR FOR VIBRATIONS OF THE AIR
Filed Jan. 27, 1917  2 Sheets-Sheet 1
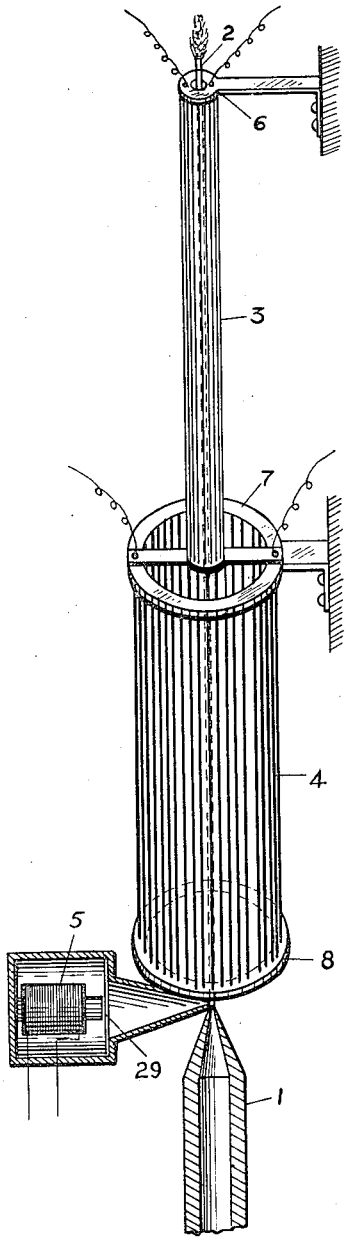
Fig. 1.
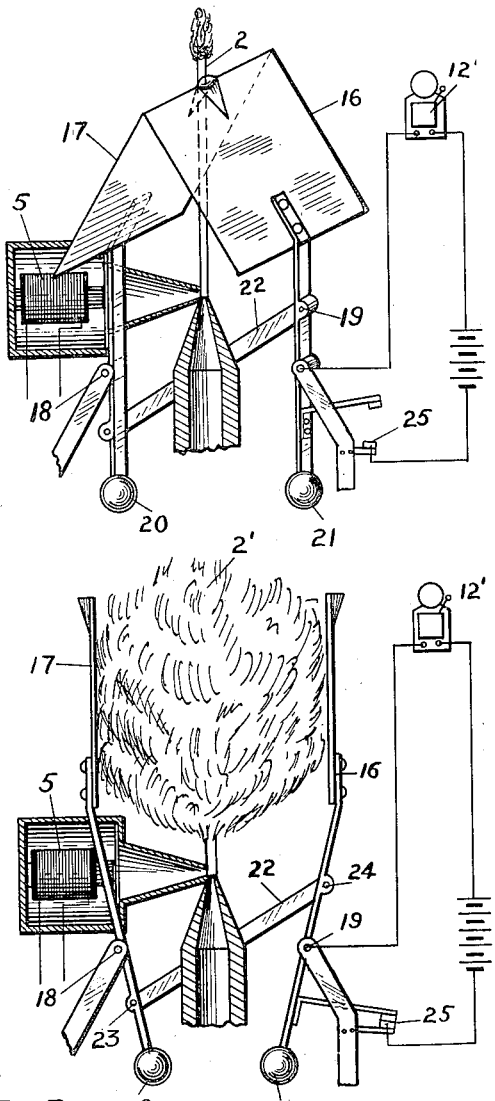
Fig. 2.
Fig. 3.
INVENTOR
ELMER A. SPERRY.
BY
Herbert H. Thompson
ATTORNEY May 8, 1923.
E. A. SPERRY
ELECTRIC INDICATOR FOR VIBRATIONS OF THE AIR
Filed Jan. 27, 1917
1,454,085
2 Sheets-Sheet 2
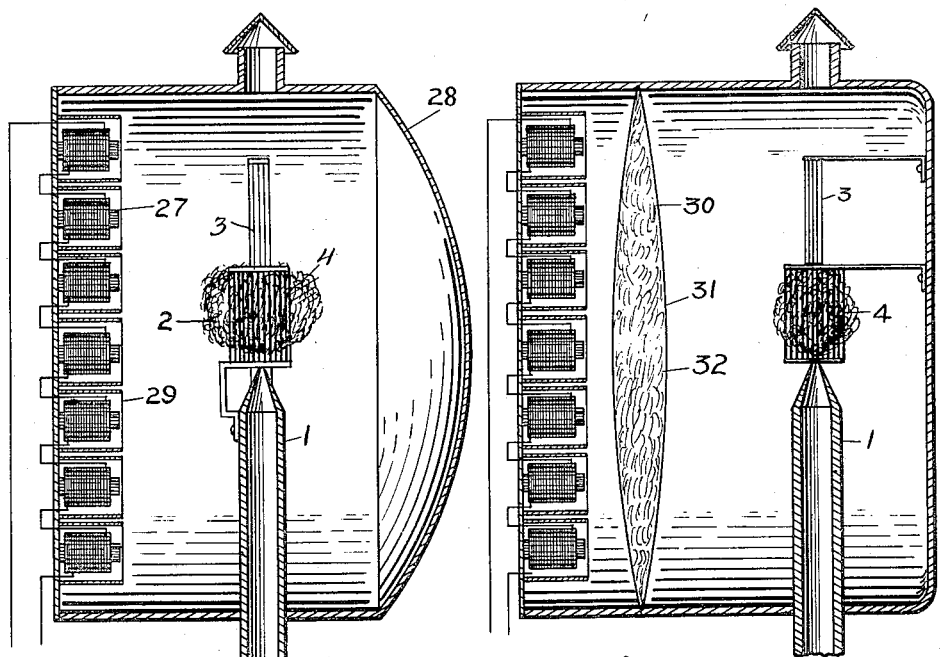
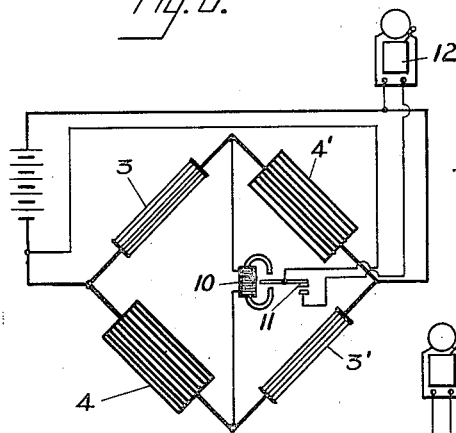
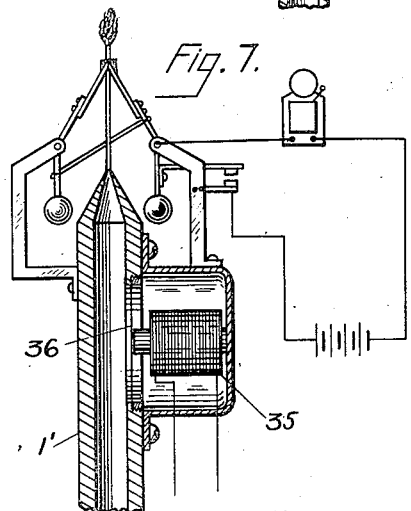
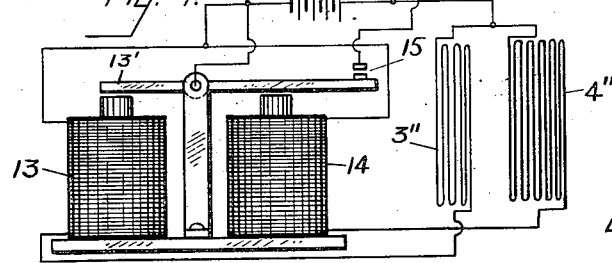
INVENTOR
ELMER A. SPERRY.
BY
Herbert H. Thompson
ATTORNEY.

Patented May 8, 1923.

1,454,085

UNITED STATES PATENT OFFICE.

ELMER A. SPERRY, OF BROOKLYN, NEW YORK.

ELECTRIC INDICATOR FOR VIBRATIONS OF THE AIR.

Application filed January 27, 1917. Serial No. 144,867.

*To all whom it may concern:*

Be it known that I, ELMER A. SPERRY, a citizen of the United States of America, residing at 1505 Albermarle Road, Brooklyn, in the county of Kings and State of New York, have invented certain new and useful Improvements in Electric Indicators for Vibrations of the Air, of which the following is a specification.

This invention relates to a method or means for indicating periodic wave motions of the air which are not readily detected by the ear. Such wave motions may consist of feeble sounds or of wave motions of a frequency above or below that of audibility. The invention has especial relation to the detection of feeble wave motions produced by radiant energy receivers, such as used in wireless telegraphy.

According to my invention I make use of a sensitive fluid jet such as a manometric flame which, as is well known, consists of a long splindling slender gas flame. Such a flame when acted upon by sound waves or the like instantly changes its form by first squatting or greatly shortening its length and then broadening or flaring out laterally in all directions as though effected by a blast or a draught. The moment the vibration ceases the jet resumes its former proportions. Adjacent the flame I place some form of sensitive electric apparatus brought into operation by changes in the form of the flame to operate an indicator.

Referring to the drawings, in which what I now consider to be the preferred forms of my inventions are shown:

Fig. 1 is a perspective view partly in section of one form of the invention.

Fig. 2 is a perspective view partly in section of a second form of the invention.

Fig. 3 is a similar view to Fig. 2 showing the flame as it appears when acted upon by sound waves.

Fig. 4 is a view of one form of receiving apparatus adapted to be used in connection with the form of the invention shown in Fig. 1.

Fig. 5 is another form of such receiving apparatus.

Fig. 6 is a modified form of the invention in which a plurality of radiant energy receivers are used.

Fig. 7 is another modification similar to that shown in Fig. 6.

Fig. 8 shows how the radiant energy receiver may be positioned in a different location from that shown in the other figures.

Referring first to Figs. 1 and 4:—1 indicates a gas jet or the like from which emerges a long spindling flame 2. Positioned adjacent the upper portion of the flame are one or more conductors 3 preferably having marked temperature resistance coefficients. Also positioned adjacent the lower portion of the flame are one or more electrical conductors 4 of similar characteristics but positioned at a greater distance from the flame than are conductors 3 and also preferably of larger diameter or greater conductivity. Both groups of wires may be arranged in the form of hollow cylinders supported on rings or brackets 6, 7 and 8.

Positioned adjacent some portion of the flame as for instance near its base, is a radiant energy receiver 5 designed to direct the sound waves produced by the diaphragm 29 at the flame. Since the production of waves of audible frequency is not necessary according to my invention, the diaphragm may be tuned to the frequency of the radio circuit or at least much nearer such frequency than would otherwise be possible.

It will at once be seen that when the flame is undisturbed that group of wires 3 will become heated while wires 4 will remain comparatively cool. On the other hand when the flame is shattered by a sound from receiver 5 wires 4 will become heated while wires 3 are allowed to cool. The entire apparatus may be enclosed in a sound proof casing (not shown) if desired.

In Fig. 4 is shown one means for making use of the variations in the electrical resistance of the wires due to changes in their temperatures for actuating the electrical indicator.

As shown, the two groups of wires are connected to form two opposite legs of a Wheatstone bridge or similar arrangement.

Across the diagonal of the bridge is connected the polarized relay 10, which upon being excited in a predetermined direction closes switch 11 and operates the indicator which in this instance is shown as a gong 12. If desired the coils 3 and 4 may be divided into two parts and connected as shown in Fig. 4, thereby forming extra resistance units 3' and 4' so that the efficiency of the bridge may be increased.

A convenient way of subdividing the group of conductors 3, shown in Fig. 1, into the two groups 3 and 3', shown in Fig. 4, is to employ every other conductor as the elements of one group and the remaining conductors as the elements of the other group. The group of conductors 4, shown in Fig. 1, may be similarly subdivided.

The wires 3 and 4 may be either connected in parallel as indicated in Fig. 4 or in the form of a continuous coil as shown in Fig. 5 at 3'', 4''.

Fig. 5 illustrates another means for operating the indicator from this form of my invention. According to this modification I employ a pair of opposed electrode magnetic elements 13 and 14 in series respectively with coils 3'' and 4''. The coils may operate on the same pivoted armature 13' so that when the resistance of coil 4'' becomes greater than that of coil 3'' magnet 13 will overcome the action of magnet 14 and the contact 15 be closed.

Alternative to this arrangement is a device such as shown in Figs. 2 and 3 in which mechanical means preferably in the form of pivoted vanes 16—17 are arranged to actuate a contact 25 controlling the electric indicator 12'. The vanes are shown as pivoted at 18 and 19, and are preferably supplied with counterweights 20 and 21 which are designed to normally hold them in a closed position as shown in Fig. 2. The vanes are also preferably connected by a link 22 extending from a point 23 below the pivotal axis 18 of vane 17 to the point 24 above the pivotal axis 19 of the vane 16, so that the vanes are constrained to move in opposite directions.

When the flame is shattered and swels out as above described the vanes are immediately opened as indicated in Fig. 3 and the electric contact 25 in circuit with indicator 12' closed.

If very feeble wave motions or wireless emanations are to be detected an arrangement such as shown in Figs. 6 and 7 may be employed. According to this modification the jet may be placed in the focus of a sound wave condenser and a plurality of radiant energy receivers 27 employed so that a greater volume of sound may be produced. In the modification shown in Fig. 6 the condenser is shown in the form of a reflector 28 designed to concentrate the wave motions produced by the diaphragms 29 of the receivers 27 on flame 2. The diaphragms are preferably pointed toward the condenser as shown and are tuned to have a natural period in synchronism with the vibrations of the electric circuit.

According to Fig. 7 the condenser is shown in the form of a convex lens 30 which may be made in the form of the membranes distended by a gas having a different index of refraction than air, such as carbon dioxide or the like.

Fig. 8 illustrates a modified form of the invention in which a telephone receiving apparatus 35 is placed within the gas tube leading to the flame so that the diaphragm 36 constitutes one of the walls of the tube. In this arrangement it will be seen the vibration is transmitted directly to the gas before reaching the flame. Other modifications will be apparent to those skilled in the art.

Thus the invention is not limited to the employment of a burning flame, but may be carried out by any form of sensitive fluid jet. This is true even of the form shown in Fig. 1, in which such a jet may be employed wherein the temperature or composition of the emerging fluid (gas or liquid) is different from that of the surrounding air or cage of wires. For instance, a jet of hydrogen may be employed. The hydrogen, being a much better conductor of heat than air, would cool rapidly either wires 3 or 4, to which a certain quantity of heat was supplied by electricity, depending on the condition of the jet.

The operation of my invention will be readily apparent from the foregoing description. It will of course be evident to those skilled in the art that the frequency of the action of indicator 12 corresponds to the frequency of the groups of radio and sound waves sent to form the usual dots and dashes of a message; or in other words, to the duration of the individual sounds and is of a very much less frequency than that of either the radio or sound waves. By my invention each group of small, high frequency oscillations are transformed into a single signal or oscillation of much greater magnitude and perceptibility.

One of the excellent features of this system is that waves of even very high frequency, much above the limit of audibility, may be utilized with full effect; thereby bearing an important relation to the efficiency and delicacy of the wireless transmissions. Of course a tuned amplifier and circuit may be employed and the diaphragms, as stated above, may be brought into harmony with the rate of this tuning, thus bringing everything into synchronism and full operation, from a very slight source of disturbance of the wireless system itself.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. An apparatus for detecting wave motions in air comprising a sensitive fluid jet, a plurality of conductors, one conductor being nearer the base of the jet than the other conductor, having a temperature-resistance coefficient, an indicating means, and means operable by variations in the resistance of said conductor due to the heating thereof when the jet collapses for operating said indicating means.

2. An apparatus for detecting wave motions in air comprising a manometric flame, a plurality of electrical conductors positioned adjacent different portions of the flame, an indicating means, and means operable by relative variations in the resistance of said conductors due to temperature changes for operating said indicating means.

3. An apparatus for detecting wave motions in air comprising a manometric flame, a plurality of electrical conductors positioned adjacent different portions of the flame, the conductors adjacent remote portions of the flame being relatively closer thereto than the conductors adjacent the base of the flame, an indicating means, and means operable by relative variations in the resistance of said conductors due to temperature changes for operating said indicating means.

4. An apparatus for detecting wave motions in air comprising a sensitive fluid jet forming a current responsive to variations in said motions, a plurality of electrical conductors positioned adjacent different portions of the jet, said conductors forming a part of a Wheatstone bridge and an indicator operable by current flowing across the bridge.

5. The method of rendering more perceptible sound which consists in concentrating the sound waves on a sensitive jet or flame, effecting a change in the condition of a Wheatstone bridge by changes in the character of the jet or flame due to the sound, and operating by such bridge an indicator.

6. An apparatus for detecting radio-oscillations, comprising a plurality of radiant energy receivers, a sensitive jet or flame, common means for concentrating the sound waves created by said receivers on said flame, and indicating means brought into action by variations in the condition of the jet.

7. An apparatus for detecting radio-oscillations, comprising a plurality of radiant energy receivers, a sensitive fluid jet, a sound condenser for concentrating the sound waves created by said receivers on said jet, and indicating means brought into action by variations in the condition of the jet.

8. An apparatus for detecting radio-oscillations, comprising a plurality of tuned radiant energy receivers, a manometric flame, a sound condenser for concentrating the sound waves created by said receivers on said flame, and indicating means brought into action by variations in the condition of the flame.

9. The method of detecting radiant energy signals which consists in translating such signals into sound waves, subjecting a sensitive fluid jet to the influence of such waves, causing variations in a Wheatstone bridge by the changes in the character of the jet due to such waves, and operating by such changes an indicating means.

10. An apparatus for detecting wave motions in air comprising a sensitive fluid jet, an electrical conductor positioned adjacent the upper portion of the jet, an electrical conductor spaced a greater distance from the lower portion of the jet, an indicating means, and means operable by variations in the resistance of said conductors due to the temperature changes for operating said indicating means.

11. An apparatus for detecting wave motions in air comprising a sensitive fluid column, an electrical conductor having a straight portion positioned parallel to said column and normally spaced therefrom, means adapted to be actuated by an electrical impulse for effecting a change in the condition of said column, an indicating means and means operable by variations in the resistance of said conductor due to changes in the condition of said column for operating said indicating means.

12. An indicating apparatus comprising means for producing a sensitive vapor column, an electric conductor adapted to lie adjacent an outer portion of a column so produced, a conductor adapted to lie nearer the base of such column, a source of energy connected with said conductors, means controlled by vibratory impulses for varying the condition of such column to effect resistance variations of said conductors, and indicating means controlled by variations in the resistance of said conductors.

13. An indicating apparatus, comprising means for producing a sensitive vapor column, a plurality of interconnected control elements responsive to the condition of said vapor column in accordance with the relative positions of said column and control elements, means for varying the condition of the column, and signalling means adapted to be actuated by said control elements.

In testimony whereof I have affixed my signature.

ELMER A. SPERRY.